United States Patent
Spradlin et al.

(10) Patent No.: US 9,946,641 B2
(45) Date of Patent: Apr. 17, 2018

(54) MEMORY MANAGEMENT MODEL AND INTERFACE FOR NEW APPLICATIONS

(71) Applicant: Microsoft Technology Licensing, LLC, Redmond, WA (US)

(72) Inventors: Jeremiah C. Spradlin, Seattle, WA (US); Galen Hunt, Bellevue, WA (US); Akshay Johar, Bellevue, WA (US); Steven Maillet, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/968,778

(22) Filed: Dec. 14, 2015

(65) Prior Publication Data

US 2016/0188454 A1    Jun. 30, 2016

Related U.S. Application Data

(63) Continuation of application No. 13/163,752, filed on Jun. 20, 2011, now Pat. No. 9,218,206.

(51) Int. Cl.
*G06F 12/02* (2006.01)
*G06F 9/50* (2006.01)

(52) U.S. Cl.
CPC .......... *G06F 12/023* (2013.01); *G06F 9/5016* (2013.01); *G06F 12/0223* (2013.01);
(Continued)

(58) Field of Classification Search
CPC .......................... G06F 9/5016; G06F 2212/70
See application file for complete search history.

(56) References Cited

U.S. PATENT DOCUMENTS 5,018,060 A * 5/1991 Gelb ..................... G06F 12/023
                                                                711/170
6,023,712 A    2/2000 Spear et al.
(Continued)

FOREIGN PATENT DOCUMENTS

CN            101146174 A      3/2008
EP              1376354 A2     1/2004
(Continued)

OTHER PUBLICATIONS

Bartzas, A. et al., "Software metadata: Systematic characterization of the memory behaviour of dynamic applications," Journal of Systems and Software, vol. 83, No. 6, Jun. 2010, Available Online Jan. 13, 2010, 25 pages.
(Continued)

*Primary Examiner* — Edward J Dudek, Jr.
*Assistant Examiner* — Andrew Russell
(74) *Attorney, Agent, or Firm* — Alleman Hall Creasman & Tuttle LLP

(57) ABSTRACT

A memory management system is described herein that receives information from applications describing how memory is being used and that allows an application host to exert more control over application requests for using memory. The system provides an application memory management application-programming interface (API) that allows the application to specify more information about memory allocations that is helpful for managing memory later. The system also provides an ability to statically and/or dynamically analyze legacy applications to give applications that are not modified to work with the system some ability to participate in more effective memory management. The system provides application host changes to leverage the information provided by applications and to manage memory more effectively using the information and hooks
(Continued)

into the application's use of memory. Thus, the system provides a new model for managing memory that improves application host behavior and allows applications to use computing resources more efficiently.

13 Claims, 8 Drawing Sheets

(52) U.S. Cl.
CPC ............... *G06F 2212/1016* (2013.01); *G06F 2212/1041* (2013.01); *G06F 2212/251* (2013.01); *G06F 2212/70* (2013.01)

(56) References Cited

U.S. PATENT DOCUMENTS

| | | | |
|---|---|---|---|
| 6,128,713 | A | 10/2000 | Eisler et al. |
| 6,205,528 | B1 | 3/2001 | Kingsbury et al. |
| 6,701,420 | B1 | 3/2004 | Hamilton et al. |
| 6,985,976 | B1 | 1/2006 | Zandonadi et al. |
| 7,035,990 | B1 | 4/2006 | Muhlbauer |
| 7,149,863 | B1 * | 12/2006 | Chew ............... G06F 9/5016 711/141 |
| 7,441,094 | B2 | 10/2008 | Stephens |
| 7,484,065 | B2 | 1/2009 | Pomaranski et al. |
| 7,752,394 | B1 | 7/2010 | Rajkumar et al. |
| 7,900,010 | B2 | 3/2011 | Prasad et al. |
| 2001/0042058 | A1 | 11/2001 | Harrington et al. |
| 2002/0083112 | A1 | 6/2002 | Wheeler et al. |
| 2003/0061402 | A1 | 3/2003 | Yadav |
| 2003/0196062 | A1 | 10/2003 | Valentin et al. |
| 2004/0003188 | A1 * | 1/2004 | Rao ............... G06F 9/5016 711/154 |
| 2005/0235124 | A1 | 10/2005 | Pomaranski et al. |
| 2006/0149915 | A1 | 7/2006 | Maly |
| 2007/0294501 | A1 * | 12/2007 | Wolf ............... G06F 9/5016 711/170 |
| 2008/0063354 | A1 | 3/2008 | Kim |
| 2009/0307455 | A1 * | 12/2009 | Pliss ............... G06F 12/023 711/170 |
| 2010/0162233 | A1 | 6/2010 | Ku et al. |

FOREIGN PATENT DOCUMENTS

| | | |
|---|---|---|
| JP | 2009543236 A | 12/2009 |
| JP | 2014523022 A | 9/2014 |

OTHER PUBLICATIONS

United States Patent and Trademark Office, Non-Final Office Action Issued in U.S. Appl. No. 13/163,752, dated Jun. 20, 2014, 17 Pages.
United States Patent and Trademark Office, Final Office Action Issued in U.S. Appl. No. 13/163,752, dated Mar. 11, 2015, 20 Pages.
United States Patent and Trademark Office, Notice of Allowance Issued in U.S. Appl. No. 13/163,752, dated Aug. 14, 2015, 9 Pages.
European Patent Office, Extended European Search Report Issued in Application No. 12802712.5, dated Mar. 14, 2016, 8 pages.
State Intellectual Property Office of the People's Republic of China, First Office Action and Search Report Issued in Application No. 201280030227.X, dated May 30, 2016, 10 pages. (Submitted with Translation of Office Action).
Hertz, et al., "Quantifying the Performance of Garbage Collection vs. Explicit Memory Management", Retrieved at <<http://citeseerx.ist.psu.edu/viewdoc/download?doi=10.1.1.61.9682&rep=rep1&type=pdf>>, Proceedings of the 20th annual ACM SIGPLAN conference on Object-oriented programming, systems, languages, and applications, vol. 40 No. 10, Oct. 16-20, 2005, pp. 14.
"What's New in the .NET Framework 4", Retrieved at <<http://msdn.microsoft.com/en-us/library/dd409230.aspx>>, Retrieved Date: Mar. 24, 2011, pp. 13.
"International Search Report", dated Feb. 7, 2013, Application No. PCT/US2012/043030, Filed Date: Jun. 18, 2012, pp. 1-9.
Taiwan Intellectual Property Office, Office Action and Search Report Issued in Taiwanese Patent Application No. 101115795, dated Sep. 14, 2016, Taiwan, 12 pages. (Submitted with English Summary of Office Action and Translation of Search Report).
Japan Patent Office, Office Action Issued in Japan Patent Application No. 2014-517070, dated Jul. 12, 2016, 5 Pages.

* cited by examiner

MEMORY MANAGEMENT MODEL AND INTERFACE FOR NEW APPLICATIONS

The present application is a continuation of U.S. patent application Ser. No. 13/163,752 filed Jun. 20 2011.

BACKGROUND

Memory management in computer systems refers to the manner in which multiple applications and an operating system agree on the use of memory. Although each computer system has a fixed amount of physical random access memory (RAM) or other memory, the operating system may present virtual memory to applications and to operating system components that represents a size of memory different from the physical memory. In some cases, virtual memory allows the operating system to restrict each application to accessing a particular portion of memory, to prevent one application from interfering with the operation of another application by accidentally or intentionally modifying the other application's memory. Operating systems generally provide one or more functions for allocating and freeing memory in response to application and operating system component requests. The operating system may provide an application with a memory pool, from which the application can allocate chunks of memory. If an application uses or group of applications together use more virtual memory than the amount of installed physical memory, the operating system may use slower disk-based storage to extend the apparent size of memory through a swap file in a process called paging or disk swapping (i.e., storing and retrieving pages of memory to disk).

Aside from the provided allocation and freeing functions, operating systems have very little insight into how applications use memory. Many computing devices contain particular limitations surrounding memory. For example, mobile computing devices may include a much smaller amount of memory than is typically available on a desktop computer system (or a system may want to de-power some memory to reduce energy consumption), creating limits for the device related to how many applications can run at the same time, how much memory each application can request/consume, and so forth. Other computing environments that host application code within a particular computing system may also enforce limitations or upper bounds on the memory usage of the environment. Hosts, such as VMware and MICROSOFT™ Virtual PC, hypervisors, operating systems, and others may be assigned limited resources. In all of these situations, effective memory management becomes more noticeable.

New computing platforms have introduced new techniques or repurposed old techniques to address the problem of limited memory shared between applications. For example, mobile phone operating systems may create a memory snapshot of each application, such that when the application is not in the foreground (e.g., being actively used) the operating system shuts it down and stores an image of the application's memory on slower storage (e.g., flash memory or other storage). When the application is selected, the operating system reloads the stored image into memory and starts the application. The application may not even be aware that it was shut down. Although such techniques are helpful, the operating system is still subject to the application's opaque requests for using memory. Currently most decisions made regarding dynamic memory usage are made based upon information found during run time. Examples of such information include the size and number of references to an allocated memory segment. This information can then be used to determine which allocations will be paged to disk, cached to high performance memory, or freed by some sort of automatic memory management system. Unfortunately, any platform is limited by potentially many years of legacy applications, so adopting new models in an area as widespread as memory management is difficult.

SUMMARY

A memory management system is described herein that receives information from applications describing how memory is being used and that allows an application host to exert more control over application requests for using memory. Today, an application host knows very little about an application's use of memory other than how many memory requests the application has made and what size of memory was requested by each request. The application host does not know, however, the purpose of each memory allocation, which memory allocations will be used soon, which memory allocations could be easily recreated if the application host needed more memory, which memory allocations will not be used for a while and thus could be paged to disk without impacting performance of the application, and so forth. Unfortunately, although the application host is tasked with making these types of decisions, the application possesses the most information about making these decisions effectively.

The memory management system overcomes these problems in several ways. First, the system provides an application memory management application-programming interface (API) that allows the application to specify more information about memory allocations that is helpful for managing memory later. The API may also provide an ability for the application host to inform the application when memory is needed and to proactively free and recreate memory allocations as needed without the application's interaction. Second, the system provides an ability to statically and/or dynamically analyze legacy applications to give applications that are not modified to work with the system some ability to participate in more effective memory management. Third, the system provides application host changes to leverage the information provided by applications and to manage memory more effectively using the information and hooks into the application's use of memory. Thus, the memory management system provides a new model for managing memory that improves application host behavior and potentially allows applications to use computing resources more efficiently.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
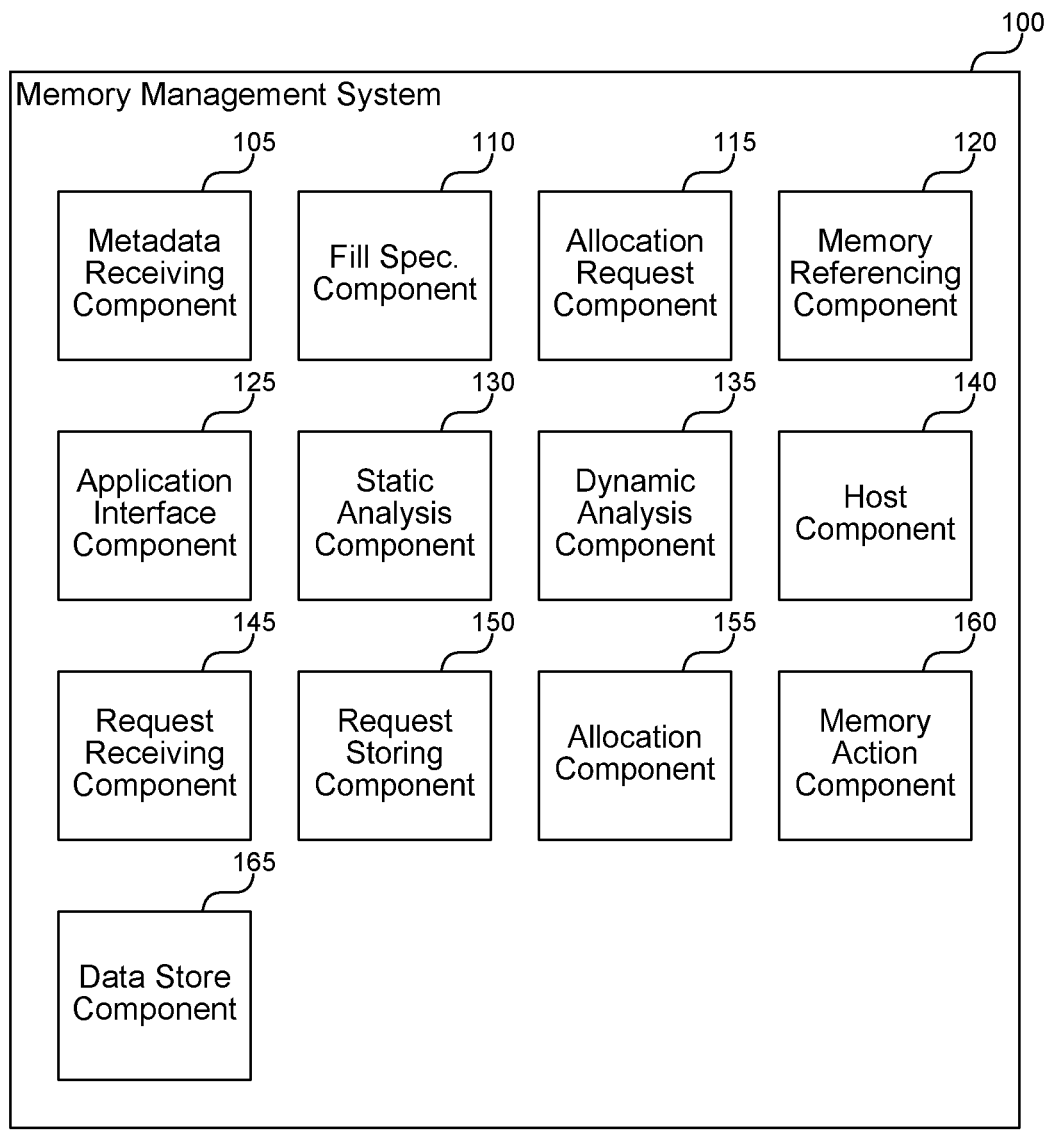
FIG. 1 is a block diagram that illustrates components of the memory management system, in one embodiment.

A memory management system is described herein that receives information from applications describing how memory is being used and that allows an application host to exert more control over application requests for using memory. Today, an application host knows very little about an application's use of memory other than how many memory requests the application has made and what size of memory was requested by each request. The application host does not know, however, the purpose of each memory allocation, which memory allocations will be used soon, which memory allocations could be easily recreated if the application host needed more memory, which memory allocations will not be used for a while and thus could be paged to disk without impacting performance of the application, and so forth. Unfortunately, although the application host is tasked with making these types of decisions, the application possesses the most information about making these decisions effectively. This conflict is resolved today by the application host providing a base level of functionality and guessing which actions to take. In many cases, the application host may page memory to disk just before the application needs the memory, or the application host may spend extensive effort managing memory that is of little importance to the application.

The memory management system overcomes these problems in several ways discussed further herein. First, the system provides an application memory management application-programming interface (API) that allows the application to specify more information about memory allocations that is helpful for managing memory later. The API may also provide an ability for the application host to inform the application when memory is needed and to proactively free and recreate memory allocations as needed without the application's interaction. Second, the system provides an ability to statically and/or dynamically analyze legacy applications to give applications that are not modified to work with the system some ability to participate in more effective memory management. Third, the system provides kernel-level operating system (or host) changes to leverage the information provided by applications and to manage memory more effectively using the information and hooks into the application's use of memory. Thus, the memory management system provides a new model for managing memory that improves application host behavior and potentially allows applications to use computing resources more efficiently. An application host, as described herein, may refer to an operating system that executes an application or another type of host (e.g., an application that itself runs on an operating system or a virtualization subsystem), such as runtimes provided by SILVERLIGHT™, .NET, a native Win32 host, or other hosts or virtual machines provided by VMware and Virtual PC. Each of the three areas introduced above is described in further detail in the following sections.

Modified Applications

In many cases, it may be possible for software developers to modify software applications to interact with the memory management system. For actively developed applications, the software developer may choose to adopt the memory management system for the benefits it provides or may be mandated by a particular platform on which the application operates to adopt the memory management system. In many cases, an application may keep memory allocated that the application is unlikely to use. For example, when a user transitions from one part of the application's user interface to another, the application may keep information from the prior interface around in case the user revisits that interface. Today, this memory looks just as needed to the host as other actively used memory. The memory management system provides a way for the application to inform the host of situations like these, so that such memory can be deprioritized. In response, the host may select such memory as a good candidate for paging or make other memory management decisions that are more efficient because of the added information from the application.

In some embodiments, the memory management system provides an application-programming model or framework that enables the memory manager to make intelligent decisions about optimizing memory usage during runtime. This is accomplished by utilizing an application programming model/framework that receives both metadata and the actions used to allocate and fill a memory allocation specified for any given memory objects an application requests. The metadata provides information that the application wants to communicate to the host describing the memory allocation's nature or purpose, such as a priority of the memory, quantity of the memory being allocated, the ease of recreating the contents of the memory from scratch (e.g., the contents may be loaded from a file or calculable by an algorithm), frequency of access, how soon the application may use the memory, and so forth. The actions used to allocate and fill the memory may provide enough information to the host to be able to free and subsequently recreate the freed memory upon the application's request. By allowing the developer to specify the metadata and the actions used to fill the memory, the memory management system can optimize memory usage consistent with the desired usage specified by the application.

The API provided to the application by the memory management system provides a means for an application developer to specify, through the application framework or programming model, metadata that describes the usage of the memory allocations. In addition, the API allows the application framework to mandate that the developer utilize standard means to fill or modify the memory through well-known functions. This allows the memory management system to opportunistically fill memory for performance reasons, to free up memory during a period of low memory availability (i.e., when the opportunity cost for freeing the memory is greater than the cost to later reallocate and re-populate the memory), or for other purposes.

Optimizing memory usage can encompass many techniques known in the art, but will generally mean optimizing for either performance or size. In the case of performance, optimizing might mean allowing as yet unneeded memory allocations to occur if the means to fulfill them are available. This may be desirable if the current CPU usage is low and the application is idle. In some cases, the application's requests to allocate memory may become notes the host stores for future reference without allocating anything at the time. Later, when the application requests to use the memory through the API or when the host determines a suitable time to fulfill the request, the memory management system actually allocates the requested memory. In the case of size, optimizing may mean reducing memory footprint or making decisions based upon the currently allocated memory and future memory needs.

The actual interface between the application and host may take a variety of forms that will be recognized by those of ordinary skill in the art. For example, the application may provide an allocation function for each type of allocation and may pass a pointer or reference to the allocation to the host in the allocation request. When the host is ready to perform the allocation, the host invokes the provided allocation function and the application creates the memory using regular memory allocation functions. Similarly, the application may pass references to other functions so that the host can request freeing memory, moving memory, switching memory contents to a different type of storage, and so forth. The same concept can also be used for allocation—when the application requests memory from the operating system, the operating system may delay allocation based on a number of factors. When the operating system is ready to allocate either a function reference is called back (with the allocated memory) or an event is raised (or similar mechanism). The interface may also receive metadata such as memory size (which may differ from the requested size), priority, caching preferences, pageability, how the memory is filled, dependencies or references to the memory, whether the memory is updated, and so on. In some embodiments, the system provides a memory interface class from which the allocation derives to define each type of memory allocation. The class may include a GetPointer function for retrieving the application-specified allocation functions, or other GetX functions for retrieving functions to perform other memory handling tasks. Alternatively or additionally, the application may make allocations in the traditional manner and then call RegisterPointer functions that registers the allocated memory with the host and specifies the additional information described herein to associate with the allocated memory. The following pseudo code provides an example of one memory class that an application could use.

```
CMemChunk // base class for all memory allocations
{
    <Global List of Allocations>
    ...
};
CMyMemory : public CMemChunk
{
    Allocate ( size );
    Fill ( ) { <how to fill memory> } // override
    Attributes <e.g., priority, pageability, etc.>
};
```

Alternatively or additionally, the developer may introduce the framework described herein into application code using source annotation language (SAL) or other markup to identify existing memory allocations and to specify additional parameters and metadata related to each allocation, access, or other memory interaction.

In some embodiments, the memory management system may operate within a single application and not be shared with the kernel or other host. The application can benefit from the improved memory management that its own internal memory manager can perform with the additional information provided by using the framework described herein. In some cases, the host may then provide a registration function that the application can call to get cross-application benefits and allow the host to also use the well-defined memory allocations and usage. As an example, the system may notify the application before a malware scan, so that the application can unload any less relevant memory to speed up the scan. As another example, the application may pre-emptively allocate memory before the CPU goes into an idle state, so that the application can quickly respond to an event when the user does something and the CPU resumes execution (enhancing responsiveness to power state changes).

Unmodified Applications

In cases, where it is not possible for software developers to modify software applications to interact with the memory management system or where the system is implemented to operate with unmodified applications (i.e., applications not specifically designed to work with the system), it is still possible for the system to provide memory management benefits. To do so, the system gathers information describing how the application uses memory itself (e.g., based on static analysis and/or profiling the application—having the application run, intercepting memory allocations, and looking at the usage across the runtime of the application). This information is useful when determining performance characteristics and may be used intelligently by the memory manager of the application's host. Examples of the way this information may be used include intelligent garbage collection, intelligent paging to disk, intelligent caching to higher-performance memory cache, and even warning the user about potential memory limitations that the application might encounter.

Utilizing static analysis of a binary, runtime analysis of the binary's behavior, and by instrumenting the binary, it is possible to gather additional information about any of the binary's given memory allocations and the usage of those allocations. This information may then be used to drive more intelligent behavior around the loading/unloading and location of the allocation within physical memory. The memory management system provides a means to automatically annotate application memory allocations with metadata describing the potential or actual usage of the allocation itself. This analysis can be automatically executed, either statically on the binary or dynamically during runtime, without requiring any developer interaction or re-authoring of existing applications. Once performed, the analysis may be cached by the system so the host operating system knows how to treat the application in the future. The analysis may also be published for discovery by other clients, not just cached locally. In addition, it is possible for the information to be exposed to the user for optional editing, allowing an administrator or user to tailor the application's metadata and how the application host will deal with the application's memory allocations.

It is possible to use static and dynamic analysis to derive additional information about an application's memory allocations, and this information may then be used to help direct the overall management of the application and system memory allocations. An example is when the memory is being touched; it is possible to determine whether another memory segment is used to help fill this memory allocation. If this memory allocation is then dependent on another allocation, either this dependency can be indicated, or the memory allocation may simply be notated by a bit to indicate it was not generated without input. Static analysis can determine where software code touches the memory, how memory is used, how memory is filled, how common a code path is (e.g., if it is write once/read many (WORM)), and how often memory is used. Dynamic analysis can instrument all allocations and/or accesses (similar to a profiler), and can capture system environment effects on the code's operation, user settings that affect operation, and other data that is not available or difficult to determine statically.

In some embodiments, the memory management system outputs a manifest or other description of an application's memory usage after the application has been analyzed. This allows the system to cache the results of the analysis and reuse the results for future execution of the application. An operating system may be designed with the system to perform this analysis the first time an application binary executes (or during processes like sequencing of application virtualization), and then to store the analysis for use each time the binary executes. The kernel or other host can read the manifest data and take appropriate action through the additional information describing how the application uses memory. Application usage may vary over time, so the manifest or other cache may be dynamically updated from time to time. In some cases, the system may allocate whole pages of memory for each allocation so that each memory access triggers a page fault that allows the kernel to control how the memory is used and provide the type of indirection between application references to memory and actual memory allocations described further herein.

In some embodiments, the system may provide reports on application memory behavior. This is another use for the analysis and may help an administrator to make decisions about the application, such as which server or virtual machine it will run well on. The system can also provide a marketplace rating of memory usage, so that users of a mobile phone application store, for example, can know before downloading an application how the application is going to use the mobile phone's available memory (e.g., high use, low use, and so on). An administrator can also use this information for IT deployment of software across various systems based on collected metadata on memory consumption.

The memory management system can use the information derived from memory usage analysis to preemptively allocate, and potentially fill, memory when the system is idle or underutilized. Knowing an application's future usage of memory allows the system to more efficiently allocate memory and to leverage times when the system is underutilized to allocate memory that may be used when the system is under heavier load. This allows the heavier load to have access to more processing or other resources made available by the work that was completed earlier.

Host Modifications

The memory management system includes modifications to a kernel or application host to receive the additional information about memory usage provided by the application or determined through analysis of the application. Unlike traditional software memory management, the kernel can do more to manage memory efficiently without the application's knowledge or action because of the added insights into memory usage provided by the metadata and other information communicated from the application described herein. The kernel may later inform the application what actions were taken or manage the memory so that it is in place by the time the application needs the memory, so that the application is unaware or unconcerned with the kernel's memory related actions. The kernel can then perform better paging (e.g., by offloading less important or unlikely to be used memory to slower disk storage), can free memory if memory pressure occurs, and can take other actions to manage memory on behalf of one or more applications using the operating environment provided by the kernel. For example, the kernel can better allocate memory for less fragmentation.

Memory is a constrained resource in an operating system; hence, it is important that the kernel properly track where memory is allocated so that it can recover memory from applications as needed. One solution is to have applications assign priority to memory as it is allocated to them. Thus, when the system determines that it is low on memory, the kernel can determine where the lowest priority memory is and deallocate or page that memory without affecting the performance of other applications with higher priority memory.

Traditionally, the priority of memory and its distribution to applications is determined by the kernel. When the system runs low on memory, the kernel may arbitrarily free memory that is used by applications with higher priority, thus interrupting or degrading the performance of the application. Instead, lower priority memory should have been deallocated first. There are interesting aspects related to how the kernel determines from which application to free memory. One solution is to have the applications determine amongst themselves what the priority order is for the memory resources. The memory priority scheme asks that applications assign the priority of memory allocated or deallocated to them at the time of allocation or deallocation. Thus, when there is memory pressure, the kernel has a memory map ranked by priorities and may free and locate the lower priority memory first. Alternatively, the kernel may send notification to the application with the list of allocations that need to be freed. The memory management system may be completely hosted by the operating system, or may be cooperative between the operating and application.

The priority model may be implemented by creating a memory allocation API that encapsulates the application whenever a memory request is made. This can also benefit applications that do not register. By utilizing this API, the application and priority is automatically tracked by the subsystem without having the application actively manage memory priority. A kernel object incorporates all of the registration, calculation, signaling, and memory management functionality so each application only has to call this object (or have it called on the application's behalf in the case of unmodified applications).

An alternative solution is to have a master application outside the kernel that is used to keep track of the various applications that are currently running. When applications request memory, they are registered to the master application. Thus, when an application becomes unresponsive, the master application may determine whether to kill the zombie application to reclaim memory or keep it hanging so that memory may be returned to the application when memory is needed.

A kernel or host can use the enhanced memory information to make a variety of memory management decisions more efficiently. For example, the kernel of a low power device may choose to turn off banks of memory to save battery life. The system may kill or swap out processes that have memory in the banks to be turned off. The system may also defragment memory spread across several banks to achieve some empty banks that can be shut off. As another example, the kernel may elect to push some memory allocations to other devices (including a cloud-based storage facility). Many small-footprint, low-power operating systems do not have the concept of paging, so in this case memory allocation might be supported over a Representational State Transfer (REST) interface hosted by another device/service. In a similar way to scrolling through a database snapshot, an application does not have the entire database in memory, but is delivered pieces from the database service/server. The application has no knowledge that they are seeing a snapshot rather than the entire database. Being able to confidently move memory around or deallocate memory allows the kernel/host to manage memory better and still uphold application expectations of memory availability.

In some embodiments, the system is used with other host-level objects or components in addition to memory. For example, the system may shut off a graphical processing unit (GPU) when a display is off, or shut off individual drivers when their associated hardware is not being used or will not be used for some time. The system can also be used for hibernation of the system, to first defragment memory and then stream a linear stream of memory allocations to disk that can be easily reloaded when it is time for the system to wake up. Unlike traditional hibernation that stores a file equal in size to the entire physical memory, the memory management system can encourage applications to free unneeded or easily recovered memory (or can do so for them) before hibernation, and thus can store a smaller amount of hibernation data. Other items managed in addition to memory may include file handles, timers, kernel objects, and so forth. The system can receive usage information about these items (or determine it from static and dynamic analysis), just like memory usage.

In some embodiments, the memory management system receives power states associated with each memory allocation. For example, at power level X, the system may determine that some memory allocations are no longer needed. This can allow a battery constrained device to switch to a lower power mode by offloading any memory that is not needed at that power level. For example, a mobile phone may keep enough application data in memory to respond to phone calls or alert the user to new email, but may unload other, lower priority functions or applications. In some cases, applications may only need to verify pointer validity before using memory in some lower power states, but may have normal access to memory in higher power states. This can be provided as a guarantee in the contract between application and host for any given platform.

System Components and Operating Environment

FIG. 1 is a block diagram that illustrates components of the memory management system, in one embodiment. The system 100 includes a metadata receiving component 105, a fill specification component 110, an allocation request component 115, a memory referencing component 120, an application interface component 125, a static analysis component 130, a dynamic analysis component 135, a host component 140, a request receiving component 145, a request storing component 150, an allocation component 155, a memory action component 160, and a data store component 165. Each of these components is described in further detail herein.

Together, the metadata receiving component 105, the fill specification component 110, the allocation request component 115, and the memory referencing component 120 make up a memory framework that the system 100 exposes to applications. Developers that are willing to modify their application code for more efficient memory management can leverage these components from their applications to create applications that allow the host or kernel to more effectively manage memory on the application's behalf.

The metadata receiving component 105 receives information associated with each memory allocation that provides information to an application host describing how the memory is used by the application. For example, the metadata may indicate how readily accessible an allocation should be for the application or how frequently the application plans to access the memory associated with the allocation. The metadata may also indicate how difficult the memory contents are to generate, and thus how difficult it would be for the application or the host to replace the memory contents if the contents were freed or paged to disk. The metadata receiving component 105 may receive metadata in a call to a memory allocation API or after memory has already been allocated in a follow up API for providing metadata.

The fill specification component 110 receives information describing how a particular memory allocation's contents are filled. The contents of memory may come from a variety of sources, such as from reading the contents of a file stored on disk, from performing one or more calculations on input data, from user input, from network accessed information (e.g., a database or the Internet), and so forth. In some embodiments, the application passes a memory filling function to the host so that the host can invoke the function to fill the memory contents at a time determined by the host. To efficiently use processing and other resources, the host may choose to delay filling the memory until resources are underutilized or idle. In addition, the host may also have the freedom to release or free previously filled memory for other uses, and then reallocate and refill the memory later before the application expects to use the memory. The received metadata may provide the information the host uses to know when the application will use the memory, or the application may inform the host before each attempt to use the memory so that the host can check the memory's current state.

The allocation request component 115 submits a request from the application to the host to allocate memory based on the received metadata and fill specification. Note that although the host receives the request, it is up to the host whether to immediately service the request in response or to wait until another appropriate time. In an extreme case, the host may not allocate any memory until it is ready to be accessed, allowing the host to conserve limited resources until the last possible moment when the memory is needed by the application and has to be allocated for the application to be able to perform its work. The allocation request component 115 stores the submitted request in a data store managed by the host and includes the received metadata and fill specification for use in later memory management actions.

The memory referencing component 120 receives an indication from the application before the application accesses memory that was the subject of a previously submitted allocation request. Because the host can make memory unavailable or delay actually allocating memory until it chooses, the application needs a way to ensure that memory is available when the application is ready to use it. The memory referencing component 120 serves this purpose, and allows the application to indicate that it is ready to access a particular memory allocation. In response, the host may pass a pointer to the actual memory location (if the memory is already available) to the application, or may create and fill the memory (if the memory is not currently allocated) based on the received fill specification and metadata. The application may send an indication to release the memory so that the host is free to once again include the memory in memory management decisions.

The application interface component 125 provides a communications interface between the application and host to negotiate use of memory allocations. The interface may include one or more functions or base classes used by the application to request memory allocations and specify information about the allocations, as well as functions or base classes used by the host to interact with the application's memory using user-defined functions provided by the application. The enhanced communication between the application and host allows the host to have a much higher than usual level of visibility into the application's use of memory, and allows the host to manage memory on behalf of a variety of applications sharing finite resources more effectively.

For applications not built to specifically to use the memory management system 100, the application interface component 125 provides interaction between any instrumented application code determined by static and/or dynamic analysis, and interacts with the host in a similar manner to that discussed previously. With applications not built to use the system 100, the system 100 may have less information about a memory allocation's purpose or other specifications, and may be limited to the information the system 100 can discover through static and dynamic analysis of the application. However, such analysis can still discover metadata useful for more effectively managing memory allocated by legacy applications. In some cases, the system 100 may be able to automatically detect how an application is filling memory and may be able to perform the same kind of on-demand filling of memory contents described previously without the application's explicit cooperation.

The static analysis component 130 statically analyzes an application binary or other application code to determine how the application uses memory. The component 130 may analyze binary code, intermediate code (e.g., MICROSOFT™ intermediate language (IL) code), or other compiled or runnable versions of an application. Static analysis has advanced substantially over the last few years, and many techniques are well known in the art for determining what an application binary does and how it does it. The memory management system 100 uses these techniques to specifically focus on areas where the application allocates and uses memory. The component 130 may instrument the application binary to receive information or intercept particular actions of the application and may replace intercepted actions with new or additional actions. For example, if the component 130 discovers a call to a memory allocation function, the component 130 may gather any metadata available from static analysis and call a version of the allocation function that can receive the metadata as a parameter. In this way, the host receives metadata information from the application just as if the application were modified by its developer to provide such information. Likewise, the system may determine how the application fills or accesses a particular memory allocation, so that the fill specification and information describing memory references can be provided to the host.

The dynamic analysis component 135 dynamically analyzes a running application to gather additional information related to the application's use of memory that is difficult to determine with static analysis. Often applications include programming steps that frustrate static analysis (either intentionally or simply because the steps turn out that way). Dynamic analysis has information available, such as the contents of responses received from external components and the actual contents of memory used by the application, for which only guesses or approximations are available during static analysis. Thus, dynamic analysis can find memory use and other application activity that is not found during static analysis. The component 135 can also use dynamic analysis to confirm results of static analysis. The dynamic analysis component 135 provides the determined information to the host to further allow legacy applications to leverage at least some functionality provided by the system 100.

The host component 140 includes an environment in which the application runs and provides access to the memory management provided by the system 100. Depending on the platform, a host can include a variety of software entities. For traditional desktop computing systems, the host is the operating system, which may include a kernel and other kernel-mode software code, such as drivers. For a managed software environment, the host may include a runtime such as the MICROSOFT™ .NET™ runtime or the MICROSOFT™ SILVERLIGHT™ runtime. Web applications may also include an application host and may run in a sandboxed environment that runs within other server or desktop computing environments. Server computing systems may include virtualization hardware or software and may include a hypervisor that operates at a higher level than one or more operating system kernels. The memory management system 100 can be implemented a variety of levels of software code, and thus is not limited to any particular type of host. The host component 140 represents the component responsible for interacting with applications and managing resources for the particular platform on which the system 100 is running.

Together, the request receiving component 145, the request storing component 150, the allocation component 155, and the memory action component 160 make up components of a memory manager modified to implement the system 100 described herein.

The request receiving component 145 receives requests from applications to allocate memory. Each request includes metadata that provides information to the host describing how the application uses the allocated memory. The request receiving component 145 may receive requests from multiple or all applications running on a particular host, so that the host has a broad range of information describing how memory is used. The host can then prioritize which allocations to impact upon deciding to take a particular action (e.g., paging out or freeing memory to reduce memory pressure).

The request storing component 150 stores received requests and associated metadata information for subsequent use during memory management decision making. The host may or may not satisfy the allocation request at the time the request is received. However, whether the host satisfies the request immediately or later, the host stores information provided by the application in association with the allocation, so that the host has the information available later when memory action is appropriate. In some embodiments, the host receives metadata and other information in a separate communication from the application after the application has allocated memory. In such cases, the host may store allocation information at multiple times or as useful information is available.

The allocation component 155 performs an actual action to allocate memory to satisfy one or more received application allocation requests. The allocation component 155 may allocate memory from an application heap or directly from physical memory installed in a computer system that is accessible to and managed by the host. After allocation, the memory is committed to a particular application and cannot be used by other applications (unless they request to do so through typical shared memory techniques). The allocation component 155 may work with page tables and virtual memory to provide a window into physical memory for the allocation, and the provided memory may be backed by disk or other storage through a swap file.

The memory action component 160 performs an action to manage memory on a device and accesses the previously stored received request information to determine one or more appropriate memory allocations that will be affected by the performed action. Actions may include swapping memory contents to a swap file, freeing previously allocated memory, requesting that an application reduce its memory footprint, or any other action that affects memory used by one or more applications. Typically, the host's purpose in performing a memory management action is to handle a current or impending condition, such as low memory (e.g., memory pressure), gathering sufficient memory to satisfy an application demand, and so on.

The data store component 165 stores information used by the host to manage memory on behalf of one or more applications. The data store component 165 may include memory set aside for use by the system 100, separate flash or disk storage, or other facilities for storing data. The data store component 165 may also include data stored in each application's memory space that tracks allocations related to that application and other information used by the host to manage memory on the application's behalf.

The computing device on which the memory management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
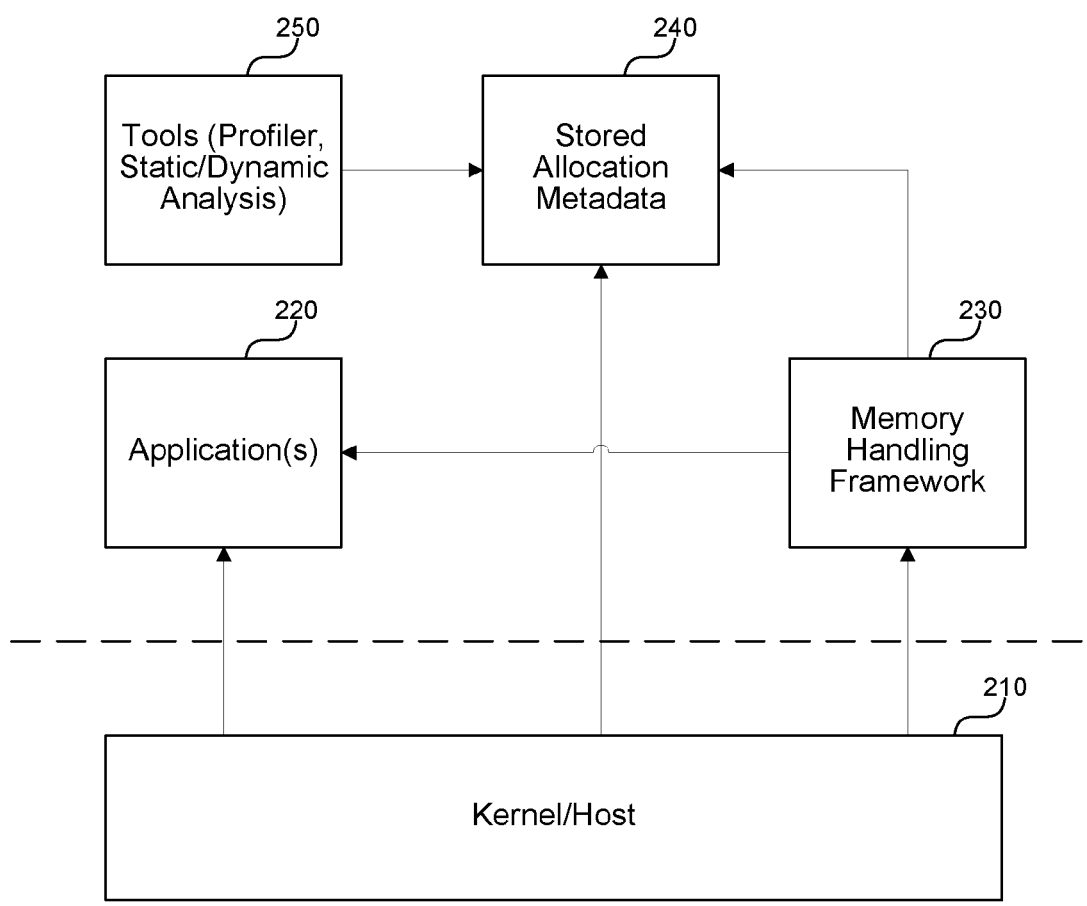
FIG. 2 is a block diagram that illustrates an operating environment of the memory management system, in one embodiment.

FIG. 2 is a block diagram that illustrates an operating environment of the memory management system, in one embodiment. The environment includes a kernel/host 210, one or more applications 220, a memory handling framework 230, stored allocation metadata 240, and one or more tools 250. The kernel/host 210 manages memory shared by the one or more applications 220. The memory handling framework 230 provides one or more APIs that the applications 220 can call to allocate memory and provide memory allocation metadata. The memory handling framework 230 stores received metadata 240. The tools 250 operate on applications that are not designed to natively provide allocation information to extract such information through static and dynamic analysis. Any extracted information is then stored as allocation metadata 240.

System Operation

Figure 3:
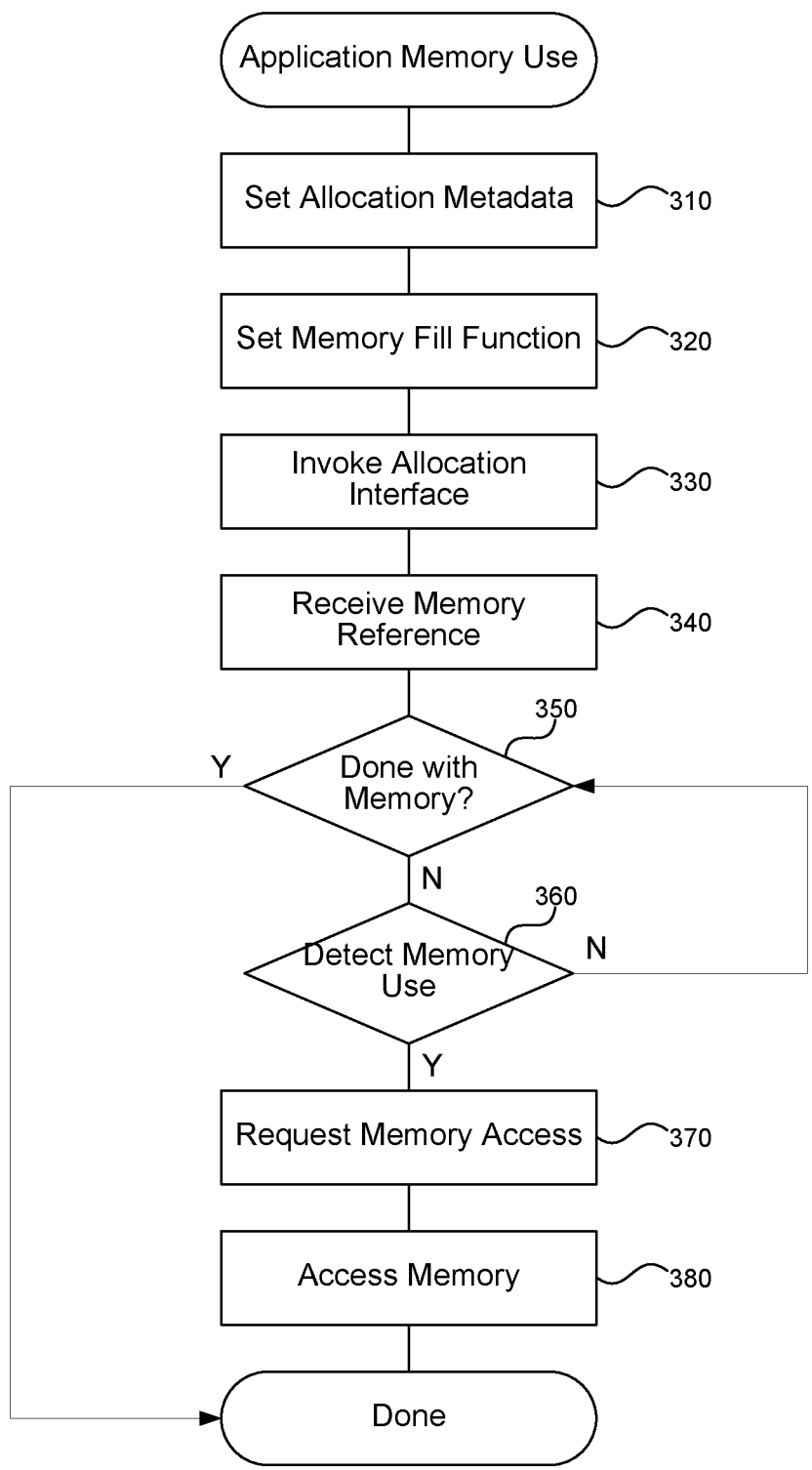
FIG. 3 is a flow diagram that illustrates processing of the memory management system within a software application to request allocation and use of memory, in one embodiment.

FIG. 3 is a flow diagram that illustrates processing of the memory management system within a software application to request allocation and use of memory, in one embodiment.

Beginning in block 310, the application sets allocation metadata that describes how an application will use a memory allocation. The application may build a parameter structure for passing to an allocation function, call an API for providing allocation metadata, or set a parameter of a derived class for allocating memory in accordance with the memory management system described herein. The allocation metadata may include a priority level of the memory to the application, how frequently the application plans to use the allocated memory, how difficult it is for the application to replace the allocation's contents, and other information related to the application's use of the memory and how the host can manipulate the memory to effectively use physical memory resources shared by multiple applications.

Continuing in block 320, the application sets a memory fill function that populates the contents of the memory allocation. The memory fill function may access information from a file, perform one or more calculations to generate results stored in the memory allocation, or perform other actions that populate the memory allocation. By providing the memory fill function to the host rather than invoking the fill function right after allocation, the application provides the host with the information needed to release and repopulate the memory as needed, or to defer allocation and initial population of the memory until a more appropriate time for the host.

Continuing in block 330, the application invokes an allocation interface provided by a host that manages physical memory shared across multiple applications, where the application provides the set allocation metadata and memory fill function to the host via the allocation interface. The allocation interface may include an operating system API, a runtime function, or other manner of passing information between the application and the host responsible for memory management. The allocation interface provides more information than is typically provided in memory allocations today, and gives the host information useful for more efficiently managing memory on a computing device.

Continuing in block 340, the application receives a reference in response to invoking the allocation interface, wherein the references serves as an indirect identifier for subsequent use of the allocated memory by the application.

The host may or may not immediately allocate the memory upon receiving the request. In addition, the host may modify the memory from time to time (e.g., releasing it, paging it to disk, and so forth) in ways for which the host needs to receive control again before the application uses the memory. Thus, the host provides the application with a reference to the memory, and when the application wants to use the memory, the application provides the reference to get direct access to the memory (e.g., a pointer).

Continuing in decision block 350, if the application detects that the application is done with the allocated memory, then the application completes, else the application continues at block 360. Before completing the application may invoke the allocation interface to deallocate (or free) the previously allocated memory. If the application did not use the memory, and the host did not actually allocate the memory, then this action may simply clean up the host's stored entry related to the allocation and return control to the application.

Continuing in decision block 360, if the application detects a use of the allocated memory in the application, then the application continues at block 370, else the application loops to block 350 to wait for a memory access or completion of the purpose of the memory allocation. The application may call a particular function wherever the memory is accessed in the application software code or may encapsulate the memory allocation in a class that wraps accesses of the memory with appropriate calls to the host to make the memory available.

Continuing in block 370, the application requests direct access to the memory allocation from the host. If the host has already allocated the memory, then the host returns a pointer to the application at which the memory can be accessed. If the host has not allocated the memory or has deallocated and reused the memory, then the host allocates the memory in response to the application request, invokes the received fill function to populate the memory contents, and then returns a pointer or other means of accessing the memory to the application.

Continuing in block 380, the application accesses the memory allocation through a received address for the memory from the host. The application may modify the memory, read information from the memory, or perform other typical memory operations. When the application is through accessing the memory, the application may indicate to the host that the host can again perform management operations that may make the memory unavailable. The application may update data used by the fill function so that if the host again repopulates the memory, the memory will include the latest changes, if any. After block 380, these steps conclude.

Figure 4:
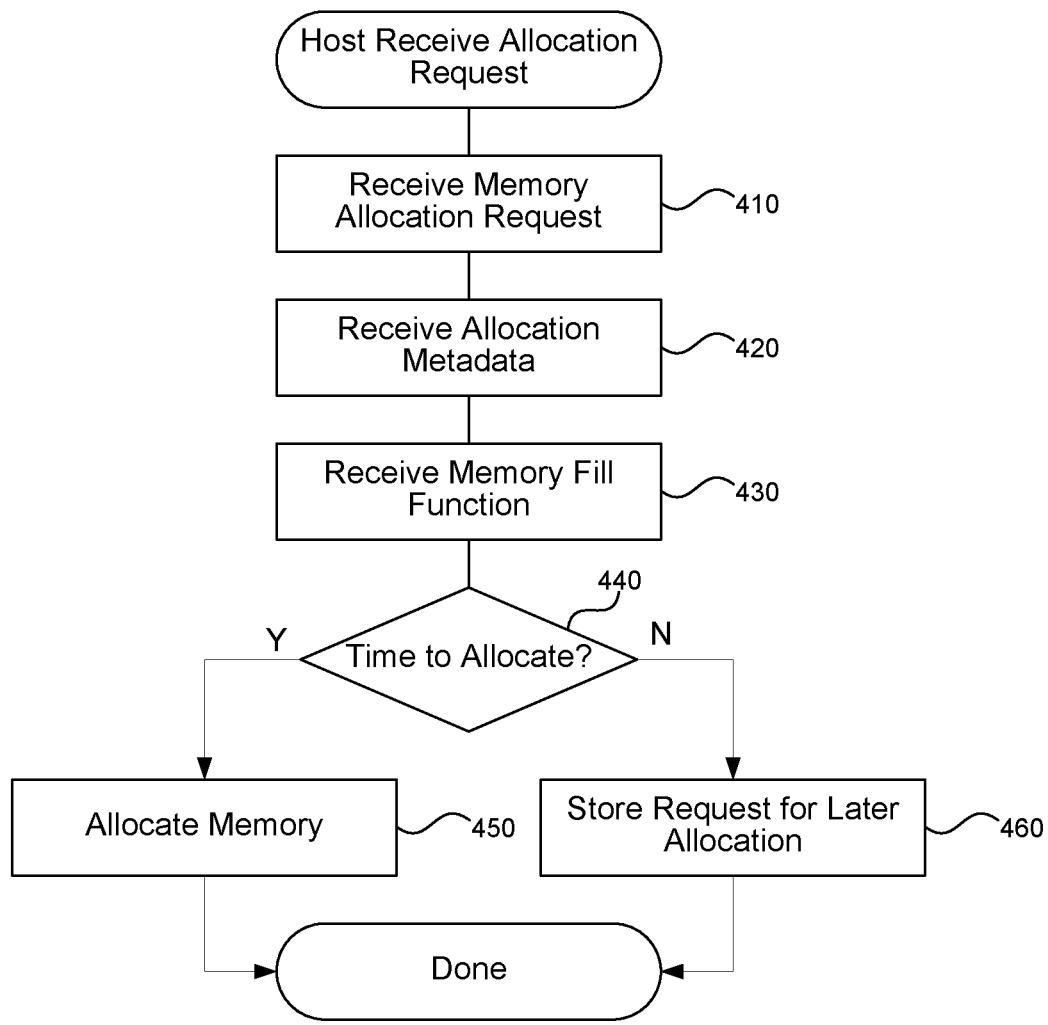
FIG. 4 is a flow diagram that illustrates processing of the memory management system within a host to receive application requests to allocate and use memory, in one embodiment.

FIG. 4 is a flow diagram that illustrates processing of the memory management system within a host to receive application requests to allocate and use memory, in one embodiment. Beginning in block 410, the host receives a memory allocation request from an application. The host may service requests from multiple applications and may include a memory manager that slices or shares limited physical memory among multiple applications running on a host platform. The memory allocation request may include information, such as the requested memory size or other parameters related to the memory requested.

Continuing in block 420, the host receives memory allocation metadata that specifies a manner in which the application plans to use the requested memory allocation. The metadata may include information such as an importance or priority of the memory allocation to the application, whether the allocation is suitable for paging to disk, whether the application can recover the contents of the memory if the host has to free the allocation, and so forth.

Continuing in block 430, the host receives a memory fill function from the application that can be invoked by the host to populate the contents of the requested memory allocation. Having the means to fill the memory allocation allows the host to defer allocation of the memory as well as to recover the memory if the host needs to free the memory allocation to satisfy another application request or to relieve other memory pressure.

Continuing in decision block 440, if the host determines that the host can allocate the memory directly in response to the request, then the host continues at block 450, else the host continues at block 460. The host may determine whether to directly allocate the memory based on how important the application indicated the memory is to the application and how frequently the application plans to access the memory. The host may also consider other factors, such as how busy a computing device on which the host is running is at the time of the request.

Continuing in block 450, the host allocates the requested memory from physical memory available to the host. The host may set up page tables or other virtual memory through which the application accesses the physical memory. Traditional hosts allocate memory in direct response to application requests or fail the request if the host cannot satisfy the request. However, the memory management system may defer requests or perform other memory management actions to more efficiently use memory and other host resources.

Continuing in block 460, the host stores the received request for later allocation along with the received metadata and fill function. The host may maintain a data store of memory requested by various applications from which to select when a memory management action (such as making more memory available) is needed. The metadata provided by the application helps the host to determine which applications and allocations within applications will be least negatively impacted by the host's memory management action. After block 460, these steps conclude.

In some cases, an application's developer is unwilling or unavailable to make changes to support new operating system features. In such cases, the memory management system may still be able to provide some enhanced memory management by analyzing the application binary information to discover information about memory allocations, as described further with reference to FIGS. 5 and 6.

Figure 5:
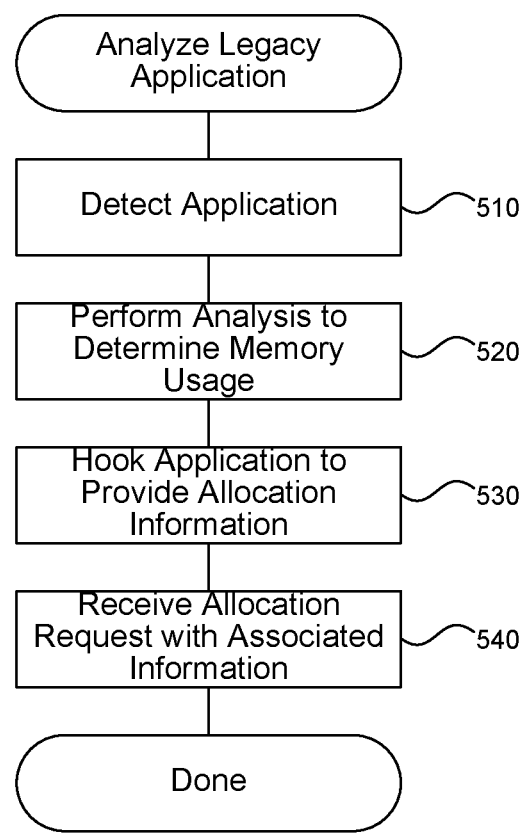
FIG. 5 is a flow diagram that illustrates processing of the memory management system to analyze an application not specifically designed to provide memory allocation information, in one embodiment.

FIG. 5 is a flow diagram that illustrates processing of the memory management system to analyze an application not specifically designed to provide memory allocation information, in one embodiment.

Beginning in block 510, the system detects an application for which information describing memory allocations made by the application is not available. The application may include a flag or other information on its binary module that specifies whether the application participates in the memory model provided by the memory management system, or may provide another indication. The system may cache previously determined application allocation information so that analysis for each application is only performed once. Thus, in this step the system also determines that the analysis has not previously been performed.

Continuing in block 520, the system performs analysis on the application to determine memory allocations made by the application. The analysis may include various forms of static and/or dynamic analysis of the application. Static analysis occurs without running the application and inspects the application's binary code to determine behavior of the application. Dynamic analysis occurs while the application is running and inspects the application's in-memory code, data structures, and other information to determine behavior of the application. The system may look for calls to specific host APIs for allocating, accessing, and freeing memory and may note locations, surrounding supplementation information, steps used to fill the allocated memory, and so forth.

Continuing in block 530, the system hooks the application to provide allocation information at locations within the application where the application allocates memory. Various forms of application hooking technologies are available, such as MICROSOFT™ Detours and others, that allow redirection of application binary code to intercept or augment an application's normal behavior at any point in the program. For example, the system may provide an application hook that invokes an allocation function for providing allocation metadata instead of a standard allocation function without metadata originally called by the application.

Continuing in block 540, the system receives a request from the application to allocate memory and associated allocation information provided by the hooked application code. The request is received by a host that may be able to determine that the allocation information is coming from an application not specifically designed to provide allocation information. The host may behave differently for such applications than for applications designed to work with the system. For example, the host may account for potentially less information that is provided by applications not designed to work with the system. In some embodiments, to encourage adoption of new memory models the system may penalize applications that do not adhere to the new memory model by preferring to swap their data to disk or perform other memory management actions when memory pressure occurs. After block 540, these steps conclude.

Figure 6:
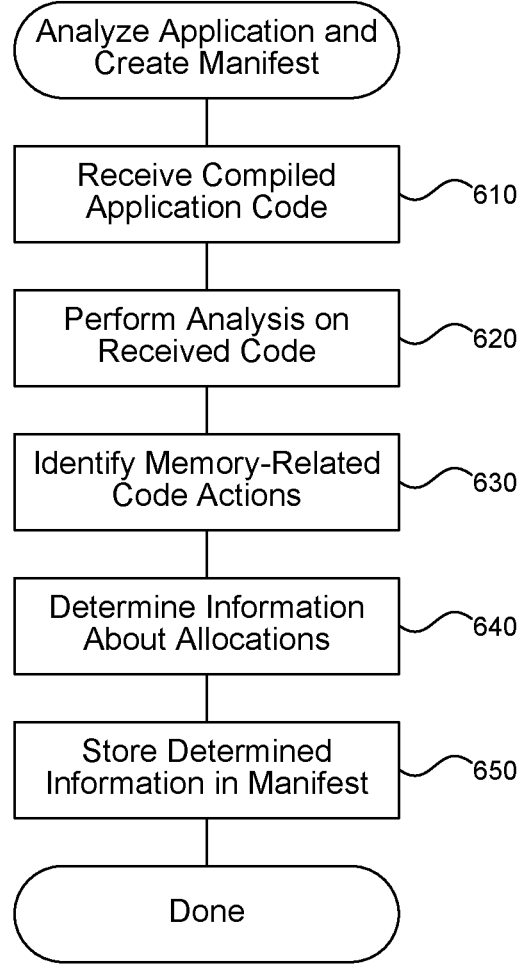
FIG. 6 is a flow diagram that illustrates processing of the memory management system to statically analyze an application and provide a manifest for enhanced memory information, in one embodiment.

FIG. 6 is a flow diagram that illustrates processing of the memory management system to statically analyze an application and provide a manifest for enhanced memory information, in one embodiment.

Beginning in block 610, the system receives compiled application code that does not provide memory allocation information in association with calls to memory allocation functions. The system may receive the application code upon a first request to run the application, during bulk processing from a scan of a computing device's hard drive or other storage, or in response to a specific user or administrator request. The compiled application code may include binary code for a particular processor (e.g., x86 or x64 binary code), intermediate language code for a particular runtime, or other forms of non-source application code. Where source is available, the application can be directly modified to use the system as described elsewhere herein.

Continuing in block 620, the system performs static analysis on the received application code to determine locations within the code where the application allocates memory. The static analysis may look for calls to memory allocation functions, such as through imported modules or other means. Static analysis is good at finding calls to functions as well as parameters passed in some cases. In some embodiments, the system augments static analysis with dynamic analysis, and runs the application to identify information not available or easily detectable statically.

Continuing in block 630, the system identifies one or more memory-related code actions in the analyzed application code. A code action may include a memory allocation, memory access, memory release, and other memory operations. The system may identify code actions by an address at which the actions occur or by other identification that can be later provided to a host or modified to change default application behavior.

Continuing in block 640, the system identifies surrounding information related to each identified code action that provides additional information describing how the allocated memory is used by the application. The surrounding information may tell the system how long the allocation is stored (e.g., used once in the same function or stored in a global variable for repeated subsequent use), how easy it is for the application to populate contents of the memory allocation, and so on. Surrounding information can be identified through static and/or dynamic analysis.

Continuing in block 650, the system stores the identified memory-related code actions and any identified surrounding information in a data store for subsequent retrieval by a host upon running the application. In some embodiments, the system stores the identified information in a manifest stored with the application module, so that a host loading the application can perform any interception or hooking of the identified locations to provide more information to the host describing memory allocations made by the application. The host can use this information, for example, to preemptively allocate memory while the system is idle or underutilized that the application will need at some time in the future, as determined by the analysis. This allows legacy applications to participate in the memory model provided by the memory management system. After block 650, these steps conclude.

Figure 7:
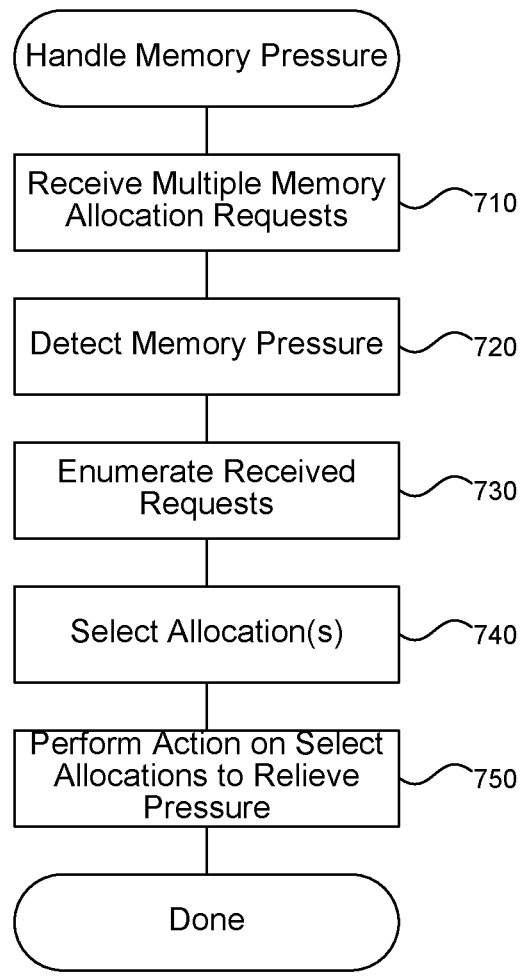
FIG. 7 is a flow diagram that illustrates processing of the memory management system to take action related to memory in response to detected memory pressure, in one embodiment.

FIG. 7 is a flow diagram that illustrates processing of the memory management system to take action related to memory in response to detected memory pressure, in one embodiment. Memory pressure can occur when a device with limited memory is nearing its available memory. For example, system operating systems may define memory pressure as occurring when 90% of physical RAM has been used.

Beginning in block 710, the system receives information describing multiple memory allocation requests and how the memory allocations are used by one or more applications. In some cases, the system stores a list or other data structure of allocations as they are received from applications, as well as associated metadata that describes how each allocation is used. The allocation use information may include priority or other information that can help the system determine which allocations can be freed, paged, or otherwise handled to efficiently manage available memory.

Continuing in block 720, the system detects memory pressure that indicates a need to act to continue efficiently running applications. The detected memory pressure may include a variety of conditions or actions the kernel or other host can take. For example, a kernel may want to switch off a bank of memory to save power, and may detect allocations stored on that bank and release or swap out those allocations to disk so that the bank can be switched off. As another example, the system may defragment memory banks to achieve empty banks that can be switched off. Where the host is not in complete control of the memory's use, it is often difficult to perform operations that move or release memory without application cooperation. However, the memory management system described herein allows the host much more information and control over how memory is managed.

Continuing in block 730, the system enumerates the received allocation requests to determine allocations on which to act. The system may traverse the list or other data structure of allocations to determine allocations that could be easily restored if they need to be freed, or allocations that an application is unlikely to use again.

Continuing in block 740, the system selects one or more of the enumerated allocations on which to act. The system may select allocations based on the received information describing how the allocation is used by the application that requested the allocation. In some cases, the system may select multiple allocations depending on particular goals (e.g., acting on a particular total size of memory and finding allocations that add up to or exceed that size) of the memory manager.

Continuing in block 750, the system performs an action on the selected allocations to relieve the memory pressure. The actions may include freeing previously allocated memory, swapping memory contents to disk or other storage, moving memory from a previous location to a new location, and so forth. In some cases, the system informs the application of the action so the application can modify behavior that depends on the allocation. For example, the application may respond by reallocating the memory next time it is used by the application. After block 750, these steps conclude.

Figure 8:
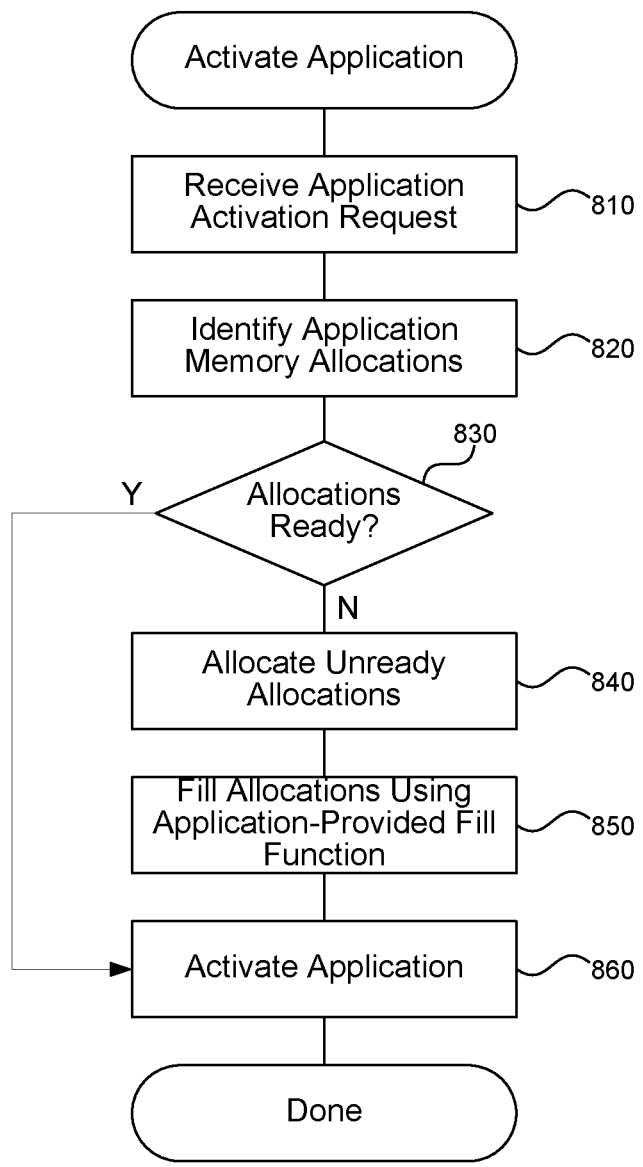
FIG. 8 is a flow diagram that illustrates processing of the memory management system to activate an application for which memory has previously been modified by a host, in one embodiment.

FIG. 8 is a flow diagram that illustrates processing of the memory management system to activate an application for which memory has previously been modified by a host, in one embodiment. In many multitasking systems, applications are pushed to the background and later reactivated by a user or the operating system. On mobile devices, users may interact with one application at a time and the operating system may suspect other applications while a particular application is at the fore. The operating system may free the other applications' memory or stream it to disk or other storage. Upon activation, the operating system may act to prepare the application to run again.

Beginning in block 810, the system receives an application request to activate. The request may come from the application itself, from a user, or from the operating system. The request to activate may simply indicate that the user is once again interacting with the application, such that the application may request previously allocated memory.

Continuing in block 820, the system identifies one or more previously received application memory allocations. The system may maintain a list or other data structure of each allocation requested by one or more allocations, so that the system can identify the previously received memory allocations by traversing the list. The system may check the status of each allocation, such as whether memory related to the allocation is still available and still contains the contents last placed there by the application.

Continuing in decision block 830, if the system determines that the application's allocations are all ready, then the system jumps to block 860, else the system continues in block 840. The system may free, move, page, or otherwise act on application allocations to provide more memory for other tasks, such as running other applications. Thus, when it is time to run the application again, the system may restore the previously acted upon allocations or may inform the application of the actions so that the application can take appropriate action.

Continuing in block 840, the system allocates the unready allocations to place the allocations in a state expected by the application. The system may assign physical memory to the allocations by allocating available physical memory to satisfy the allocation. In some cases, the system may provide virtual memory, such as that backed by physical memory and a swap file.

Continuing in block 850, the system fills the allocated memory contents using a fill function provided by the application. The application provides sufficient information to the system so that the system can release and recreate memory allocations of the applications. This allows the system to make efficient decisions to share resources between applications, while keeping negative effects on applications low. Ideally, when the system is under memory or other pressure, the system frees or moves memory that was not going to be used soon anyway, and then has time to restore the memory before it is needed again. In traditional systems, the best a host can do is guess, but using the memory management system herein, the host can very effectively select one or more memory allocations upon which to act.

Continuing in block 860, the system activates the requested application and provides the application with the memory allocations expected by the application. The system may suspend the application while preparing memory for the application, then resume the application when all of the application's memory allocations are ready. After block 860, these steps conclude.

From the foregoing, it will be appreciated that specific embodiments of the memory management system have been described herein for purposes of illustration, but that various modifications may be made without deviating from the spirit and scope of the invention. Accordingly, the invention is not limited except as by the appended claims.

We claim:

1. A method for memory allocation, the method comprising: at an enhanced memory management system, receiving a request for a memory allocation from a software application via an application programming interface (API), the request specifying allocation metadata that describes use of the memory allocation by the software application; and
    at the enhanced memory management system, receiving a memory fill function via the API, the memory fill function configured to access information from a file to populate contents of the memory allocation.

2. The method of claim 1 wherein specifying allocation metadata comprises building a parameter structure for passing to an allocation function that receives the allocation metadata.

3. The method of claim 1 wherein specifying allocation metadata comprises calling a separate API for providing the allocation metadata after an allocation has occurred.

4. The method of claim 1 wherein specifying allocation metadata comprises specifying a parameter of a derived class for allocating memory that receives the allocation metadata to enhance memory management.

5. The method of claim 1 wherein the allocation metadata comprises metadata that includes a priority level of the memory allocation to the software application.

6. The method of claim 1 wherein the allocation metadata comprises metadata that includes a frequency the software application plans to use contents of the memory allocation.

7. The method of claim 1 wherein the memory fill function is callable to populate the contents of the memory allocation on the software application's behalf without involving the software application.

8. The method of claim 1 further comprising providing information needed to release and repopulate contents of the memory allocation, or to defer allocation and initial population of contents of the memory allocation until a more appropriate time.

9. A computer system for providing an application host with more control over allocation and use of memory within a software application, the system comprising:
- a processor and a memory configured to execute software instructions embodied within the following components;
  - a metadata receiving component that receives information associated with each memory allocation that provides information to an application host describing how the memory is used by the software application;
  - a fill specification component that receives a memory fill function via an application programming interface (API), the memory fill function configured to access information from a file to populate contents of the memory allocation;
  - an allocation request component that submits a request from the application to the host to allocate memory based on at least the information received by the metadata receiving component; and
  - a host component that includes an environment in which the application runs and provides a memory manager that uses at least the information received by the metadata receiving component to manage memory.

10. The system of claim 9 wherein the metadata receiving component receives information that indicates how readily accessible an allocation should be for the application or how frequently the application plans to access the memory associated with the allocation.

11. The system of claim 9 wherein the metadata receiving component receives information that indicates how difficult it would be for the application or the host to replace the contents of each memory allocation if the contents were freed.

12. The system of claim 9 wherein the fill specification component passes the memory fill function to the host so that the host can invoke the function to fill the contents of each memory allocation at a time determined by the host.

13. A computer executable method for controlling a computer system to receive application requests to allocate and use memory within a host, comprising:
- receiving a memory allocation request from an application via an application programming interface (API), wherein the host services requests from multiple applications and includes a memory manager that shares limited physical memory among the multiple applications running on the host;
- receiving memory allocation metadata that specifies use of a requested memory allocation by the software application,
- receiving a memory fill function via the API, the memory fill function configured to access information from a file to populate contents of the requested memory allocation; and
- storing the received memory allocation request for later allocation along with the received memory allocation metadata,
- wherein the host maintains a data store of memory requested by various applications from which to select when a memory management action is needed.

* * * * *